United States Patent Office 3,459,955
Patented Aug. 5, 1969

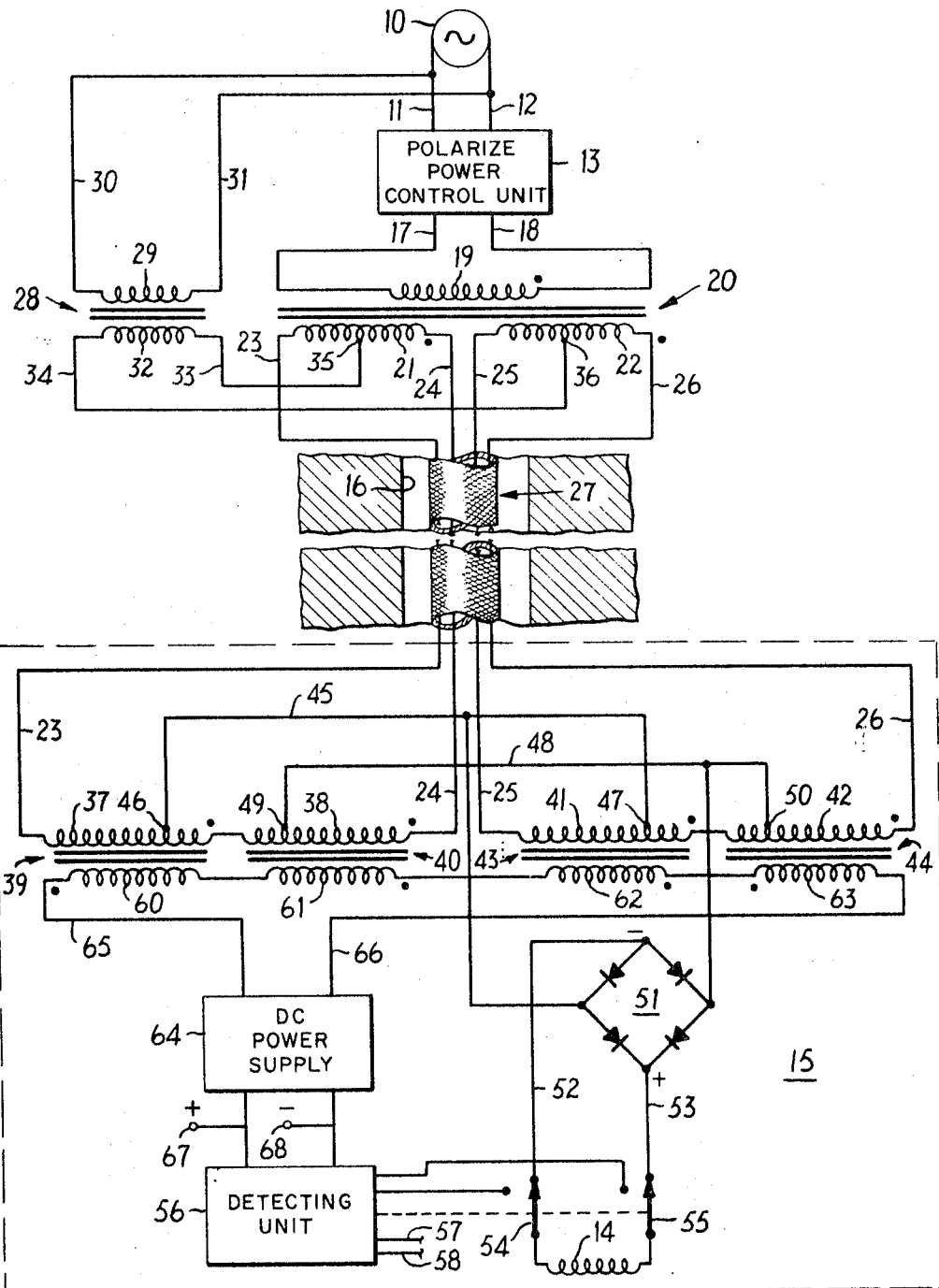

3,459,955
ELECTRIC POWER TRANSMISSION SYSTEM FOR WELL LOGGING
Loyal L. Hurlbert, Houston, Tex., assignor to Schlumberger Technology Corporation, Houston, Tex., a corporation of Texas
Filed Aug. 2, 1966, Ser. No. 569,722
Int. Cl. H02j 3/02
U.S. Cl. 307—12            3 Claims

---

ABSTRACT OF THE DISCLOSURE

In the particular embodiment of the invention described herein, two different types of electrical power are supplied through a four-conductor cable by connecting two secondary coils of a first transformer to two pairs of cable conductors, respectively, and the secondary coil of another transformer between center taps on the two secondaries of the first transformer. At the other end of the cable, the pairs of conductors are each connected across the primaries of a pair of transformers and the oppositely wound secondaries of both pairs of transformers are connected in series to produce one type of electrical power. Appropriately positioned taps on the primaries of the transformer pairs provide the other type of power.

---

This invention relates to systems for transmitting electric power from the surface of the earth to an instrument within a well bore and, more particularly, to a new and improved power transmission system providing greater economy of equipment than present systems.

In well logging operations wherein a downhole instrument supported by a multiconductor cable is supplied with different types of electric power, the number of cable conductors normally required to transmit the power may exceed the number of available conductors in the cable. For example, in nuclear magnetism logging wherein free protons in the formation adjacent to the well bore are polarized by a very strong magnetic field generated within the instrument, four cable conductors are often utilized to supply the polarizing power from the surface of the earth because of the high current requirements. In such cases, there may well be an insufficient number of conductors in the cable to transmit the other types of power required by the instrument and also provide the proper number of channels for relaying detected information to the surface of the earth.

Accordingly, it is an object of the present invention to provide a new and improved electric power transmission system for well logging which overcomes the above-mentioned disadvantages of present systems.

Another object of the invention is to provide an improved electric power transmission system for well logging in which different types of electric power are transmitted over the same cable conductors.

These and other objects of the invention are attained by providing two pairs of conductors for transmission of one type of power and coupling means for coupling a second type of power to the conductors of each pair equally, the polarity of the coupling being opposite for one pair of conductors with respect to the other pair. In a particular embodiment of the invention, a first transformer supplies one type of power to the two pairs of conductors, dividing the power equally between them, and a second transformer is centrally coupled to the secondaries of the first transformer. At the opposite end of the cable, the conductor pairs energize separate transformers having one set of secondary windings linked to produce the first type of power and another set of secondaries arranged to produce the second type of power.

Further objects and advantages of the invention will be apparent from a reading of the following description in conjunction with the accompanying drawing, which is a schematic circuit diagram illustrating the arrangement of a representative power transmission system according to the invention which is adapted for use in connection with nuclear magnetism logging operations.

In the representative embodiment of the invention illustrated in the drawing, an alternating current power source 10 at the surface of the earth is connected through two conductors 11 and 12 to a polarize power control unit 13 which is arranged to control the application of polarizing power to a polarizing coil 14 in a nuclear magnetism instrument 15 disposed in a well bore 16. The particular manner of operation of the unit 13 may be in accordance with the system described in the copending application of John H. Baker, Ser. No. 537,475, filed Mar. 25, 1966, for "Nuclear Magnetism Logging System," or any conventional nuclear magnetism technique, and does not constitute any part of the present invention. From the unit 13, two conductors 17 and 18 lead to the primary winding 19 of a power transformer 20.

Two isolated secondary windings 21 and 22 are each connected at opposite ends to corresponding pairs of conductors 23, 24 and 25, 26, which are included in a cable 27 from which the downhole logging instrument 15 is suspended in the well bore 16. The cable 27 may be, for example, from 5,000 to 25,000 feet long and, in addition to the power transmission conductors 23–26, will ordinarily contain several further conductors (not illustrated) which are utilized for transmission of the detected nuclear magnetism signals and for controlling other operations in the instrument. Usually, the current supplied to the polarizing coil 14 during energization is of the order of 5 to 10 amperes and, to reduce the current requirements of the cable conductors, the transformer 20 is arranged to increase the voltage from that of the source 10 which may be 115 volts, for example, to about 1,000 volts for each of the secondary windings 21 and 22. Inasmuch as the ultimate voltage applied across the coil 14 during energization is on the order of about 100 volts and the current will be derived from both pairs of conductors, the required capacity of each cable conductor is reduced to a fraction of an ampere.

In order to supply additional power for use in the downhole instrument 15 as, for example, to energize electronic circuit components, another transformer 28 has a primary winding connected by two conductors 30 and 31 to the alternating current power source 10. The secondary winding 32 of this transformer, which produces about 75 volts, for example, is connected by two conductors 33 and 34 to center taps 35 and 36, respectively, in the two secondary windings 21 and 22 of the transformer 20. In this way, current supplied from the secondary winding 32 affects both halves of each secondary winding 21 and 22 equally in opposite directions and, therefore, has no influence on the operation of the transformer 20. For the same reason, the current from the secondary 32 is transmitted equally through the conductors 23, 24, 25 and 26 and, therefore, has no influence on the manner of transmission of the current induced by the transformer 20.

Within the instrument 15 at the downhole end of the cable 27, the conductors 23 and 24 are joined to the series-connected autotransformer windings 37 and 38 of two transformers 39 and 40, respectively, the windings 37 and 38 being wound in the same direction as indicated by the dot notation. Similarly, the conductors 25 and 26 lead from the cable 27 to the series-connected autotransformer windings 41 and 42 of two further transformers 43 and 44, these windings also being wound in the same direction. To provide current for the polarizing coil 14, a first output conductor 45 is connected to two taps 46 and 47 at identical locations on the windings 37 and 41, respectively, which are two-thirds of the way toward the other windings 38 and 42. In addition, a second output conductor 48 is connected to two taps 49 and 50 at identical locations in the windings 38 and 42, which are two-thirds of the way toward the other windings 37 and 41, respectively.

Because of line losses in the cable 27, the voltage appearing across each pair of primary windings will be reduced substantially from the voltage applied to the conductors at the surface of the earth. Assuming line losses of, for example, 50%, about 500 volts will be applied to each pair of windings and, by virtue of the location of taps 46, 47, 49 and 50, each pair of transformer windings will supply about 167 volts A.C. across the conductors 45 and 48. A full wave rectifier unit 51 connected at opposite sides to the conductors 45 and 48 converts the alternating current to direct current and the output from the rectifier unit is applied through two conductors 52 and 53 and two switches 54 and 55 to opposite ends of the polarizing coil 14.

After polarization, the signal induced in the coil 14 by nuclear magnetism effects of the materials in the formation adjacent to the well bore 16 are transmitted to a detecting unit 56 by operation of the movable switch contacts 54 and 55, the polarizing current having been discontinued by the polarized power control unit 13. In the detecting unit 56, the signals are converted to appropriate form for transmission to the surface of the earth through two output conductors 57 and 58.

In order to supply operating power to the electronic components of the detecting unit, the transformers 39, 40, 43 and 44 are each provided with isolated secondary windings 60, 61, 62 and 63, respectively. These windings are connected in series and, as shown in the drawing, are oppositely wound with respect to each pair of transformers 39, 40 and 43, 44, the pair 60, 61 also being oppositely wound with respect to the other pair 62, 63. A D.C. power supply unit 64 connected to these windings by two conductors 65 and 66 converts the A.C. voltage induced therein to 48 volts D.C. and supplies this voltage to two output terminals 67 and 68 for utilization in the detecting unit 56 and other components of the instrument 15.

In operation, alternating current power supplied from the power source 10 through the polarize power control unit 13 energizes the transformer 20 inducing like voltages in the identical secondaries 21 and 22. This voltage, reduced by losses in the lines 23, 24, 25 and 26, is applied to the autotransformer windings 37, 38 and 41, 42 inducing a lower voltage across the lines 45 and 48. Because the autotransformer windings are identical and the taps are disposed at corresponding locations, there is no tendency for the voltage generated by one pair of windings to oppose that produced by the other. Also, since the isolated secondary windings 60, 61, 62 and 63 are connected in opposed relation for each pair of transformers 39, 40 and 43, 44, the tendency for the polarizing current to induce voltages in these windings is completely cancelled out and the D.C. power supply is not influenced by the polarizing current. Following rectification by the rectifier 51, the polarizing current is applied to the coil 14 under the control of the polarize power control unit 13, the switches 54 and 55 being closed.

At the same time, the transformer 28 is energized from the power source 10 causing equal and opposite voltage to be applied to the center taps 35 and 36 so that the conductors 23, 24, 25 and 26 carry equal current, the direction being opposite as between the pairs 23, 24 and 25, 26. In the transformers 39, 40, 41 and 42, this current flows equally but in opposite directions through each pair of autotransformer primaries from the conductors 23, 24 and 25, 26 to the taps 46, 49 and 47, 50, respectively, the circuit being completed by equal currents flowing in the same direction through the conductors 45 and 48. As a result of this arrangement, current supplied by the transformer 28 has no influence on the rectifier 51 and does not contribute to the current supplied to the polarizing coil 14. In the oppositely wound isolated secondary windings 60, 61, 62 and 63, however, the currents flowing through the autotransformer primaries induce voltages which add together so as to supply current from the conductors 55 and 56 to the D.C. power supply 64. In this way, each power supply system is entirely independent of the other even though the same conductor pairs are utilized to transmit both types of power.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. Electric power transmission apparatus comprising two pairs of conductor means, first coupling means for coupling a first type of power to both conductor pairs in similar electrical relation with opposite polarity applied to the conductors of each pair, second coupling means for coupling a second type of power to both conductor pairs in opposed electrical relation with the same polarity applied to the conductors of each pair, third coupling means including power output means for the first type of power coupled to both conductor pairs in similar electrical relation and responsive to similar energization of both conductor pairs with the polarity of the conductors in each pair being opposite and substantially nonresponsive to opposed energization of the conductor pairs with the conductors of each pair having the same polarity, and fourth coupling means including power output means for the second type of power coupled to both conductor pairs in opposed electrical relation with the same polarity coupling to both conductors in each pair wherein the first coupling means comprises transformer means including identical output winding means connected to each pair of conductors in the same manner and the third coupling means comprises further transformer means including identical winding means connected to each pair of conductors in the same manner.

2. Electric power transmission apparatus according to claim 1 wherein the second coupling means comprises transformer means having an output winding connected to center taps on the identical output winding means of the first coupling means, and the fourth coupling means comprises secondary winding means in each transformer means of the third coupling means responsive in an opposite manner to each pair of conductors.

3. Electric power transmission apparatus comprising two pairs of conductor means, first coupling means for coupling a first type of power to both conductor pairs in similar electrical relation with opposite polarity applied to the conductors of each pair, second coupling means for coupling a second type of power to both conductor pairs in opposed electrical relation with the same polarity applied to the conductors of each pair, third coupling means including power output means for the first type of power coupled to both conductor pairs in similar electrical relation and responsive to similar energization of both conductor pairs with the polarity of the conductors in each pair being opposite and substantially nonresponsive to opposed energization of the conductor pairs with the conductors of each pair having the same polarity, and fourth coupling means including power output means for the second type of power coupled to both conductor pairs in opposed electrical relation with the same polarity coupling to both conductors in each pair wherein the first coupling means comprises a transformer having a primary winding connected to a source of alternating current and two identical isolated secondary windings connected to the two pairs of conductors respectively, the second coupling means comprises a transformer having a primary winding connected to a source of power and a secondary winding connected across center taps of the isolated secondary windings of the first coupling means, the third coupling means comprises two autotransformers connected in series across each pair of conductors with the output means including conductors connected to corresponding taps on the autotransformer windings, and the fourth coupling means comprises a plurality of series-connected isolated secondary windings in the autotransformers of the third coupling means.

References Cited

UNITED STATES PATENTS

| | | | |
|---|---|---|---|
| 3,121,840 | 2/1964 | Lamb | 340—18 X |
| 3,223,968 | 12/1965 | Shazo | 340—18 |
| 3,309,657 | 3/1967 | Rabson et al. | 340—18 |
| 3,340,500 | 9/1967 | Boyd et al. | 340—18 |

ROBERT K. SCHAEFER, Primary Examiner

H. J. HOHAUSER, Assistant Examiner

U.S. Cl. X.R.

340—18